US012346042B2

(12) United States Patent
Matsuura

(10) Patent No.: US 12,346,042 B2
(45) Date of Patent: Jul. 1, 2025

(54) IMAGE FORMING APPARATUS USING PLURAL TEST IMAGES FORMED WITH DIFFERENT TEST VOLTAGES

(71) Applicant: CANON KABUSHIKI KAISHA, Tokyo (JP)

(72) Inventor: Taisuke Matsuura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/585,062

(22) Filed: Jan. 26, 2022

(65) Prior Publication Data

US 2022/0253005 A1 Aug. 11, 2022

(30) Foreign Application Priority Data

Feb. 8, 2021 (JP) ................................. 2021-018316

(51) Int. Cl.
*G03G 15/16* (2006.01)

(52) U.S. Cl.
CPC ................................ *G03G 15/1605* (2013.01)

(58) Field of Classification Search
CPC ..... G03G 2215/00569; G03G 15/1675; G03G 15/5062
See application file for complete search history.

(56) References Cited

U.S. PATENT DOCUMENTS 7,003,237 B2 2/2006 Miyamoto et al.
8,843,003 B2 9/2014 Nakao
9,715,193 B2 7/2017 Nakaegawa et al.
10,180,641 B2 * 1/2019 Itagaki .............. G03G 15/5062
11,126,115 B2 9/2021 Sueoka
11,137,709 B2 10/2021 Kohno et al.
(Continued)

FOREIGN PATENT DOCUMENTS

CN 104350430 A 2/2015
CN 111665702 A 9/2020
(Continued)

OTHER PUBLICATIONS

Extended European Search Report dated Sep. 28, 2022, in European Patent Application No. 21216248.1.
(Continued)

*Primary Examiner* — Arlene Heredia
(74) *Attorney, Agent, or Firm* — Venable LLP

(57) ABSTRACT

An image forming apparatus includes an image bearing member, a transfer belt, a secondary transfer member, a voltage source, a current detecting portion, and a controller. The controller is operable in a first mode in which when a recording material is absent in a secondary transfer portion, a current flowing through the secondary transfer member under application of a first test voltage is detected by the current detecting portion and then information on a current-voltage characteristic of the secondary transfer member is acquired, and in a second mode in which a predetermined test image is transferred from the transfer belt onto the recording material under application of second test voltages and then a test chart for adjusting a transfer voltage set during transfer is outputted. On the basis of the information, the controller changes an interval of the second test voltages applied in the operation in the second mode.

7 Claims, 10 Drawing Sheets

(56) References Cited

U.S. PATENT DOCUMENTS

| | | | | |
|---|---|---|---|---|
| 11,195,068 | B2 | 12/2021 | Omata | |
| 11,747,760 | B2 | 9/2023 | Kakehi | |
| 2004/0184830 | A1 | 9/2004 | Miyamoto et al. | |
| 2013/0039673 | A1 | 2/2013 | Nakao | |
| 2017/0097593 | A1 | 4/2017 | Itagaki | |
| 2017/0364010 | A1* | 12/2017 | Ogawara | G03G 15/1675 |
| 2018/0017904 | A1* | 1/2018 | Aiba | G03G 15/1675 |
| 2020/0193247 | A1 | 6/2020 | Song et al. | |
| 2020/0242428 | A1 | 7/2020 | Omata | |
| 2020/0285176 | A1 | 9/2020 | Sueoka | |
| 2022/0091552 | A1* | 3/2022 | Kakehi | G03G 15/5062 |
| 2022/0308505 | A1* | 9/2022 | Kobayashi | G03G 15/1675 |
| 2022/0357693 | A1* | 11/2022 | Kobayashi | G03G 15/5062 |

FOREIGN PATENT DOCUMENTS

| | | | | | |
|---|---|---|---|---|---|
| CN | 112147867 | A | * | 12/2020 | G03G 15/1605 |
| CN | 115343931 | A | * | 11/2022 | G06F 3/1204 |
| JP | 2004-280003 | A | | 10/2004 | |
| JP | 2008-152168 | A | | 7/2008 | |
| JP | 2012-123309 | A | | 6/2012 | |
| JP | 2013-037185 | A | | 2/2013 | |
| JP | 2016-180872 | A | | 10/2016 | |
| JP | 2017-072689 | A | | 4/2017 | |
| JP | 2018-010140 | A | | 1/2018 | |
| JP | 2018-063357 | A | | 4/2018 | |
| JP | 2020086248 | A | * | 6/2020 | |
| JP | 2020-118932 | A | | 8/2020 | |
| JP | 2020-144289 | A | | 9/2020 | |
| JP | 2021-009211 | A | | 1/2021 | |
| JP | 2021-009346 | A | | 1/2021 | |
| WO | 2021/002410 | A1 | | 1/2021 | |

OTHER PUBLICATIONS

Examination Report dated Sep. 26, 2024, in European Patent Application No. 21216248.1.

Office Action dated May 12, 2025, in Chinese Patent Application No. 202210109658.0.

* cited by examiner

IMAGE FORMING APPARATUS USING PLURAL TEST IMAGES FORMED WITH DIFFERENT TEST VOLTAGES

FIELD OF THE INVENTION AND RELATED ART

The present invention relates to an image forming apparatus such as a copying machine, a printer, a facsimile machine, or a multi-function machine having a plurality of functions of these machines.

In the image forming apparatus, a toner image is transferred from a photosensitive drum onto a recording material directly or via an intermediary transfer belt. For this reason, a transfer member for forming a transfer portion for transferring the toner image between the recording material and the photosensitive drum or the intermediary transfer belt is provided. Further, a type for appropriately setting a transfer voltage applied to the transfer portion during image formation has been conventionally known.

For example, in Japanese Laid-Open Patent Application No. 2013-37185, a type (adjusting mode of secondary transfer voltage) in which a plurality of pattern images transferred with different transfer voltages are outputted, and on the basis of the pattern image, an optimum transfer voltage is selected and is reflected in the transfer voltage during the image formation is disclosed.

Here, in an operation in the adjusting mode of the secondary transfer voltage the plurality of pattern images (predetermined images) are transferred on a recording material with different transfer voltages between which a predetermined difference is provided, but due to a change in resistance value of the transfer member with use, a change in environment, or the like, a change amount of a current value at each of the transfer voltages varies. For example, when the resistance value of the transfer member becomes high, the change amount of the current value becomes small relative to a change amount of the transfer voltage.

In this case, the change amount of the current value for each of the pattern images is small, so that a difference in transfer property is not readily distinguished and thus the optimum transfer voltage is not readily discriminated. On the other hand, in the case where the number of the pattern images to be outputted is increased, the number of the recording materials onto which the pattern images are transferred increases.

SUMMARY OF THE INVENTION

A principal object of the present invention is to provide an image forming apparatus capable of improving selection accuracy of an optimum transfer voltage while suppressing an increase in number of outputted recording materials (sheets) onto which predetermined images are transferred.

According to an aspect of the present invention is to provide an image is forming apparatus comprising: an image bearing member configured to bear a toner image; a transfer belt onto which the toner image is primary-transferred from the image bearing member; a secondary transfer member configured to secondary-transfer the toner image from the transfer belt onto a recording material in a secondary transfer portion; a voltage source configured to apply a transfer voltage to the secondary transfer member; a current detecting portion capable of detecting a current-flowing from the voltage source through the secondary transfer member; and a controller capable of controlling the voltage source, wherein the controller is capable of executing an operation in a first mode in which when the recording material is absent in the secondary transfer portion, a current flowing through the secondary transfer member under application of a first test voltage to the secondary transfer member is detected by the current detecting portion and then information on a current-voltage characteristic of the secondary transfer member is acquired, wherein the controller is capable of executing an operation in a second mode in which when the recording material is present in the secondary transfer portion, a predetermined test image is transferred from the transfer belt onto the recording material under application of a plurality of different second test voltages to the secondary transfer member and then a test chart for adjusting a transfer voltage set during transfer is outputted, and wherein on the basis of the information acquired during the operation in the first mode, the controller changes an interval of the second test voltages applied in the operation in the second mode.

Further features of the present invention will become apparent from the following description of exemplary embodiments with reference to the attached drawings.

DESCRIPTION OF THE EMBODIMENTS

First Embodiment

A first embodiment will be described using FIGS. 1 to 9. First, an image forming apparatus according to this embodiment will be described using FIGS. 1 and 2.

[Image Forming Apparatus]

In this embodiment, as an example of an image forming apparatus 1, a full-color printer of a tandem type using an intermediary transfer type will be described. The image forming apparatus 1 includes an apparatus main assembly

Figure 2:
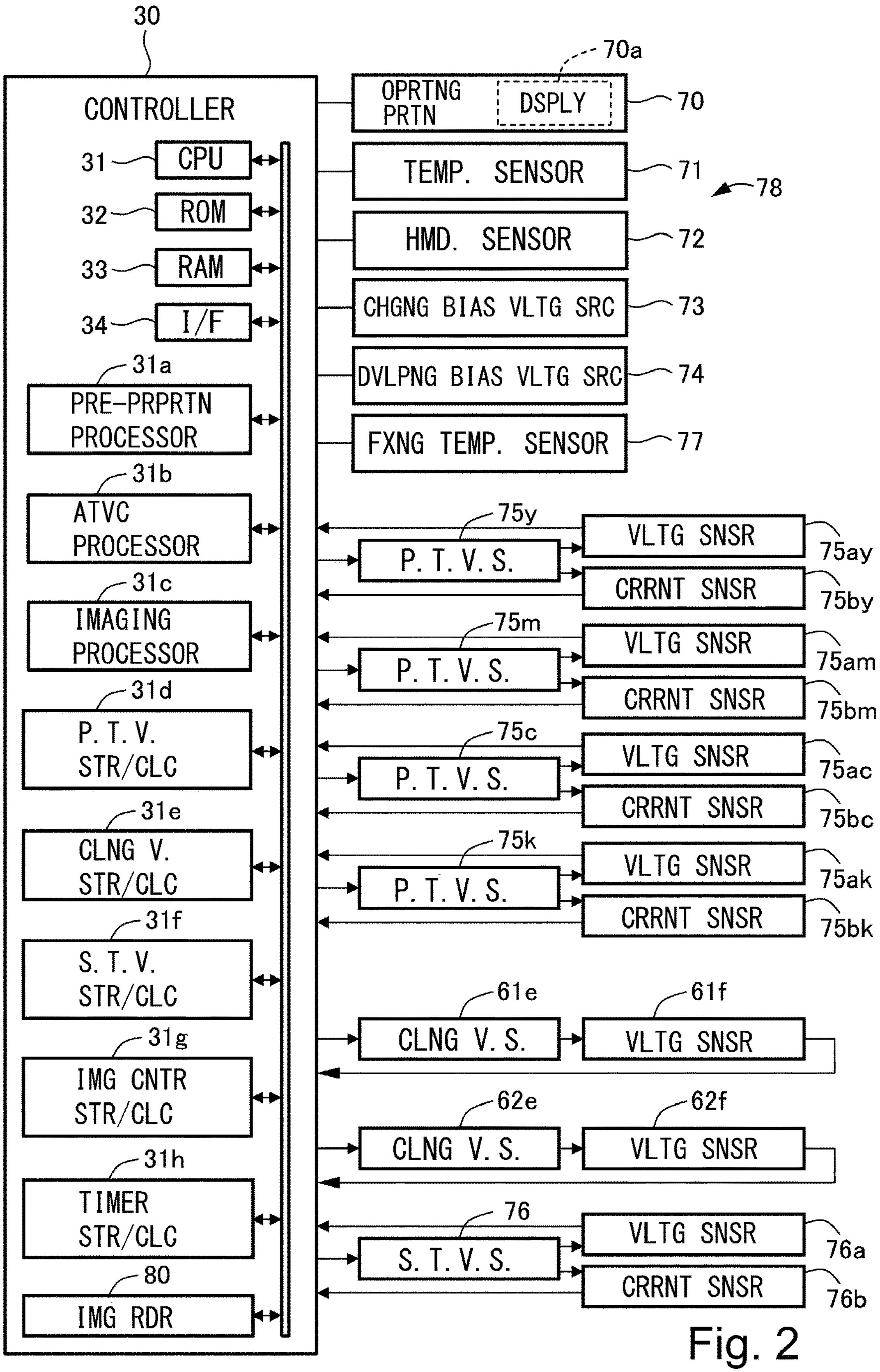
FIG. 2 is a control block diagram of the image forming apparatus according to the first embodiment.

10, an unshown recording material feeding portion, an image forming portion 40, an unshown recording material discharging portion, a controller 30, and an operating portion 70 (see FIG. 2).

Inside the apparatus main assembly 10, a temperature sensor 71 (see FIG. 2) capable of detecting a temperature in the image forming apparatus 1 and a humidity sensor 72 (see FIG. 2) capable of detecting a humidity in the image forming apparatus 1 are provided. The image forming apparatus 1 can form a four color-based full-color image on a recording material S depending on an image signal from an image reading portion 80, a host device such as a personal computer, or an external device such as a digital camera or a smartphone. Incidentally, the recording material S is one on which a toner image is formed, and as a specific example, it is possible to cite sheet materials such as plain paper, a synthetic resin sheet which is a substitute for the plain paper, thick paper, a sheet for an overhead projector, and the like.

The image forming portion 40 is capable of forming an image, on the basis of image information, on the recording material fed from the recording material feeding portion. The image forming portion 40 includes image forming units 50*y*, 50*m*, 50*c* and 50*k*, toner bottles 41*y*, 41*m*, 41*c* and 41*k*, exposure devices 42*y*, 42*m*, 42*c* and 42*k*, an intermediary transfer unit 44, a secondary transfer device 45, and a fixing portion 46.

The image forming apparatus 1 can achieve full-color image formation, and the plurality of image forming units 50*y*, 50*m*, 50*c* and 50*k* have the constitution for four colors of yellow (y), magenta (m), cyan (c) and black (k), respectively, and are separately provided. For this reason, in FIG. 1, respective constituent elements for the four colors are shown by adding color identifiers to reference numerals thereof, but in the following description, description will be made using the constituent elements of the image forming unit 50*y* as a representative in some cases. Incidentally, the image forming apparatus 1 is also capable of forming a single-color image of, for example, black or a multi-color image using the image forming unit 50 for a desired single color or the image forming units 50 for some of the four colors, respectively.

The image forming unit 50*y* includes a photosensitive drum 51*y* as an image bearing member movable while bearing the toner image, a charging roller 52*y* as a charging device, a developing device 20*y*, a pre-exposure device 54*y*, and a cleaning device provided with a cleaning blade 55*y*. The image forming unit 50*y* is integrally assembled into a unit as a cartridge, and is constituted so as to be mountable in and dismountable from the apparatus main assembly 10. The image forming unit 50*y* forms the toner image on an intermediary transfer belt 44*b* described later.

The photosensitive drum 51*y* is rotatable and bears an electrostatic image used for image formation. In this embodiment, the photosensitive drum 51*y* is formed in a cylindrical shape of 30 mm in outer diameter and is a negatively chargeable organic photosensitive member (OPC). Further, the photosensitive drum 51*y* is rotationally driven at a predetermined process speed (peripheral speed) in an arrow direction. The photosensitive drum 51*y* uses a cylinder made of aluminum as a base material and includes, as a surface layer at a surface thereof, three layers consisting of an undercoating layer, a photocharge-generating layer, and a charge-transporting layer which are successively laminated in a named order on the base material.

The charging roller 52*y* contacts the surface of the photosensitive drum 51*y* and uses a rubber roller rotatable by rotation of the photosensitive drum 51*y*, and electrically charges the surface of the photosensitive drum 51*y* uniformly. To the charging roller 52*y*, a charging bias voltage source 73 (see FIG. 2) is connected. The charging bias voltage source 73 applies a charging bias to the charging roller 52*y* and charges the photosensitive drum 51*y* via the charging roller 52*y*. The exposure device 42*y* is a laser scanner and forms the electrostatic image on the photosensitive drum 51*y* by emitting laser light in accordance with the image information of separated color outputted from the controller 30.

The developing device 20*y* develops the electrostatic image, formed on the photosensitive drum 51*y*, into a toner image with toner under application of a developing bias. The developing device 20*y* includes a developing sleeve 24*y* as a developer carrying member. The developing device 20*y* not only accommodates a developer supplied from the toner bottle 41*y*, but also develops the electrostatic image formed on the photosensitive drum 51*y*.

The developing sleeve 24*y* is constituted by a non-magnetic material of, for example, aluminum or non-magnetic stainless steel, and in this embodiment, the developing sleeve 24*y* made of aluminum is used. Inside the developing sleeve 24*y*, a roller-shaped magnet roller is fixedly provided in a non-rotatable state relative to a developing container. The developing sleeve 24*y* carries the developer including non-magnetic toner and a magnetic carrier and feeds the developer to a developing region opposing the photosensitive drum 51*y*. To the developing sleeve 24*y*, a developing bias voltage source 74 (see FIG. 2) is connected. The developing bias voltage source 74 applies a developing bias to the developing sleeve 24*y*, and develops the electrostatic image formed on the photosensitive drum 51*y*.

The toner image formed on the photosensitive drum 51*y* through development is primary-transferred onto the intermediary transfer belt 44*b* of the intermediary transfer unit 44. The photosensitive drum 51*y* after the primary transfer is charge-removed at the surface thereof by the pre-exposure device 54*y*. The cleaning blade 55*y* is of a counter blade type and is contacted to the photosensitive drum 51*y* with a predetermined pressing force. After the primary transfer, the toner remaining on the photosensitive drum 51*y* without being transferred onto the intermediary transfer belt 44*b* is removed by the cleaning blade 55*y* provided in contact with the photosensitive drum 51*y* and prepares for a subsequent image forming step.

The intermediary transfer unit 44 includes a driving roller 44*a*, a follower roller 44*d*, an inner secondary transfer roller 45*a*, the intermediary transfer belt 44*b* stretched by these rollers (stretching rollers), and primary transfer rollers 47*y*, 47*m*, 47*c* and 47*k*, and the like. The intermediary transfer belt 44*b* as an image bearing member and an intermediary transfer member form primary transfer portions 48*y*, 48*m*, 48*c* and 48*k* between itself and the photosensitive drums 51*y*, 51*m*, 51*c* and 51*k*, respectively, and is circulated and moved (i.e., rotated) while carrying the toner images. The follower roller 44*d* is a tension roller for controlling tension of the intermediary transfer belt 44*b* at a certain level. To the follower roller 44*d*, a force such that the intermediary transfer belt 44*b* is pressed toward the surface of the intermediary transfer belt 44*b* is applied by an urging force of an unshown urging spring, so that tension of about 2-5 kgf is applied to the intermediary transfer belt 44*b* in a (recording material) feeding direction of the intermediary transfer belt 44*b* by this force.

The primary transfer rollers 47*y*, 47*c*, 47*c* and 47*k* are disposed opposed to the photosensitive drums 51*y*, 51*m*, 51*c* and 51*k*, respectively, via the intermediary transfer belt 44*b*.

The primary transfer roller 47y is disposed so as to sandwich the intermediary transfer belt 44b between itself and the photosensitive drum 51y, and primary-transfers the toner image, formed on the surface of the photosensitive drum 51y, onto the intermediary transfer belt 44b at the primary transfer portion 48y by applying a primary transfer voltage thereto. To the primary transfer roller 47k, a primary transfer voltage source 75y is connected. To the primary transfer voltage source 75y, a voltage detecting sensor 75ay for detecting an output voltage and a current detecting sensor 75by for detecting an output current are connected (see FIG. 2).

Incidentally, the primary transfer voltage sources 75y, 75m, 75c and 75k are provided for the primary transfer rollers 47y, 47m, 47c and 47k, respectively, and primary transfer voltages applied to the primary transfer rollers 47y, 47m, 47c and 47k are independently controllable.

The primary transfer roller 47y is, for example, 15-20 mm in outer diameter, and includes an elastic layer of an ion-conductive foam rubber (NBR rubber) and a core metal. As the primary transfer roller 47y, a roller of $1\times10^5$-$1\times10^8\Omega$ in resistance (measured under N/N (23° C., 50% RH) condition, under application of 2 kV) is used. Incidentally, this is also true for other primary transfer rollers 47m, 47c and 47k.

The intermediary transfer belt 44b is rotatable and is rotated in an arrow direction at a predetermined speed. The intermediary transfer belt 44b contacts the photosensitive drums 51y, 51m, 51c and 51k and forms the primary transfer portions 47y, 48m, 48c and 48k between itself and the photosensitive drums 51y, 51m, 51c and 51k, respectively. The primary transfer voltage is applied from the primary transfer voltage sources 75y, 75m, 75c and 75k (see FIG. 2) to the primary transfer portions 48y, 48m, 48c and 48k, respectively, whereby the toner images formed on the photosensitive drums 51y, 51m, 51c and 51k are primary-transferred at the primary transfer portions 48. To the intermediary transfer belt 44y, the primary transfer voltage of the positive polarity is applied by the primary transfer rollers 47y, 47m 47c and 47k, whereby the toner images of the negative polarity are successively multiple-transferred from the photosensitive drums 51y, 51m, 51c and 51k onto the intermediary transfer belt 44b.

The intermediary transfer belt 44b is an endless belt including a three-layer structure consisting of a base layer, an elastic layer, and a surface layer from a back surface side. As a resin material constituting the base layer, a material in which carbon black is contained as an anti-static agent, in an appropriate amount, in a resin such as polyimide or polycarbonate or in various rubbers is used, and a thickness of the base layer is 0.05-0.15 mm. As an elastic material constituting the elastic layer, a material in which an ion-conductive agent is contained, in an appropriate amount, in various rubbers, such as urethane rubber and silicone rubber is used, and a thickness of the elastic layer is 0.1-0.500 mm.

A material constituting the surface layer is a resin material such as fluorine-containing resin, and a depositing force of the toner onto the surface of the intermediary transfer belt 44b is made small, so that the toner is easily transferred onto the recording material S at a secondary transfer portion N. The thickness of the surface layer is 0.0002-0.020 mm. In this embodiment, as regards the surface layer, one kind of resin materials of polyurethane, polyester, epoxy resin, and the like, or two or more kinds of materials of elastic materials such as an elastic rubber, elastomer, butyl rubber, and the like is used as a base material.

Further, in this base material, as a material for enhancing a lubricating property by making surface energy small, one kind or two or more kinds of powder or particles of the fluorine-containing resin are dispersed or such powder or particles are dispersed with different particle sizes, so that the surface layer is formed.

The intermediary transfer belt 44b in this embodiment is $5\times10^8$-$1\times10^{14}$ Ω·cm (23° C., 50% RH) in volume resistivity and is 60-85° (23° C., 50% RH) in MD1 hardness. Further, a coefficient of static friction is 0.15-0.6 (23° C., 50% RH) measured by type 94i manufactured by HZIDON (Shinto Scientific Co., Ltd.). In this embodiment, the intermediary transfer belt 44b has the three-layer structure, but may also have a single-layer constitution of the material corresponding to the above-described base layer.

The secondary transfer device 45 includes the inner secondary transfer roller 45a as an inner roller and an outer secondary transfer roller 45b as an outer roller and a transfer member. The inner secondary transfer roller 45a stretches the intermediary transfer belt 44b in contact with an inner surface of the intermediary transfer belt 44b, and is disposed opposed to the outer secondary transfer roller 45a via the intermediary transfer belt 44b. To the outer secondary transfer roller 45b, a secondary transfer voltage source 76 is connected. To the secondary transfer voltage source 76, a voltage detecting sensor 76a for detecting an output voltage and a current detecting sensor 76b as a current detecting portion for detecting an output current are connected (see FIG. 2).

The secondary transfer voltage source 76 applies a DC voltage, as a secondary transfer voltage, to the outer secondary transfer roller 45b. The outer secondary transfer roller 45b contacts the intermediary transfer belt 44b and forms the secondary transfer portion N between itself and the intermediary transfer belt 44b. By applying the secondary transfer voltage of a polarity opposite to the charge polarity of the toner, the outer secondary transfer roller 45b collectively secondary-transfer the toner images, primary-transferred and carried on the intermediary transfer belt 44b, onto the recording material S supplied to the secondary transfer portion N.

Incidentally, the secondary transfer voltage source 76 may also be connected to the inner secondary transfer roller 45a. That is, the secondary transfer voltage source 76 applies, to the inner secondary transfer roller 45a or the outer secondary transfer roller 45b, the secondary transfer voltage for transferring the toner images from the intermediary transfer belt 44b onto the recording material S.

In this embodiment, a core metal of the inner secondary transfer roller 45a is connected to a ground potential. When the recording material S is supplied to the secondary transfer device 45, in this embodiment, the secondary transfer voltage which is subjected to constant-voltage control in which the polarity is opposite to the charge polarity of the toner is applied to the outer secondary transfer roller 45b. For example, the secondary transfer voltage of 1-7 kV is applied and a current of 40-120 μA is caused to flow through the outer secondary transfer roller 45b, so that the toner images on the intermediary transfer belt 44b are secondary-transferred onto the recording material S.

The outer secondary transfer roller 45b is, for example, 20-25 mm in outer diameter, and includes an elastic layer of an ion-conductive foam rubber (NBR rubber) and a core metal. As the outer secondary transfer roller 45b, a roller of $1\times10^5$-$1\times10^8\Omega$ in resistance (measured under N/N (23° C./50% RH) condition, under application of 2 kV) is used.

Further, the intermediary transfer unit 44 includes a belt cleaning device 60. The belt cleaning device 60 removes a deposited matter such as the toner remaining on the intermediary transfer belt 44*b* after a secondary transfer step. In an example shown in FIG. 1, as the belt cleaning device 60, a constitution including two cleaning portions 61 and 62 to which voltages of polarities different from each other is shown. Each of the cleaning portions 61 and 62 is provided with a fur brush rotatable in contact with the intermediary transfer belt 44*b* and a collecting roller for collecting the toner deposited on the fur brush. By applying the voltages different in polarity from each other to the cleaning portions 61 and 62, the residual toner on the intermediary transfer belt 44*b* is removed. Incidentally, the belt cleaning device 60 may also be a belt cleaning device provided with a cleaning blade for removing the residual toner or the like in contact with the intermediary transfer belt 44*b*.

The fixing portion 46 includes a fixing roller 46*a* and a pressing roller 46*b*. Between the fixing roller 46*a* and the pressing roller 46*b*, the recording material S is nipped and fed, whereby the toner image transferred on the recording material S is heated and pressed and thus is fixed on the recording material S. Incidentally, a temperature of the fixing roller 46*a* is detected by a fixing temperature sensor 77 (see FIG. 2). The recording material discharging portion discharges the recording material S, fed through a discharging passage, for example, through a discharge opening and then stacks the recording material S on a discharge tray. Further, between the fixing portion 46 and the discharge opening, an unshown reverse feeding passage in which the recording material S after the fixing is turned upside down and is capable of being passed through the secondary transfer device 45 again is provided. By an operation of the reverse feeding passage, formation of images on double sides of a single recording material can be realized.

At an upper portion of the apparatus main assembly 10, an automatic original feeding device 81 for automatically feeding the recording material (original) on which an image is formed toward an image reading portion 80, and the image reading portion 80 for reading the image of the recording material fed is by the automatic original feeding device 81 are provided. This image reading portion 80 is constituted so that the original disposed on a platen glass 82 is illuminated with an unshown light source and that the image on the original is read by an unshown image reading element at a dot density determined in advance.

As shown in FIG. 2, the controller 30 as a control means is constituted by a computer and is capable of controlling respective constituent elements of the image forming apparatus 1. The controller 30 includes, for example, a CPU 31, a ROM 32 for storing programs for controlling respective portions, a RAM 33 for temporarily storing data, and an input/output circuit (I/F) 34 for inputting/outputting signals from/to an external portion. The CPU 31 is a microprocessor for managing entirety of control of the image forming apparatus 1 and is a main body of a system controller. The CPU 31 is connected to the recording material feeding portion, the image forming portion 40, the recording material discharging portion, and the operating portion 70 via the input/output circuit 34, and not only transfers signals between itself and respective portions but also controls operations of the respective portions.

In the ROM 32, an image formation control sequence for forming an image on the recording material S, and the like are stored.

To the controller 30, the charging bias voltage source 73, the developing bias voltage source 74, the primary transfer voltage sources 75*y*, 75*m*, 75*c* and 75*k*, and the secondary transfer voltage source 76 are connected and are controlled by signals from the controller 30, respectively. Further, to the controller 30, the temperature sensor 71, the humidity sensor 72, the voltage detecting sensor 76*a* and the current detecting sensor 76*b* for the secondary transfer voltage source 76, and the fixing temperature sensor 77 are connected. Further, to the controller 30, the voltage detecting sensors 75*ay*, 75*am*, 75*ac* and 75*ak* and the current detecting sensors 75*by*, 75*bm*, 75*bc* and 75*bk* for the primary transfer voltage sources 75*y*, 75*m*, 75*c* and 75*k* are connected. Signals detected by the respective sensors are inputted to the controller 30. Incidentally, by the temperature sensor 71 and the humidity sensor 72, an environment detecting portion 78 capable of detecting values relating to a temperature and a humidity is formed.

The operating portion 70 includes a display portion 70*a* consisting of operating buttons, a liquid crystal panel, and the like. A user is capable of executing an image forming job by operating the operating portion 70, and the controller 30 receives a signal from the operating portion 70 and causes the various devices of the image forming apparatus 1 to operate. The image forming job refers to a series of operations, executed on the basis of an instruction from the operating portion 70 or the external device connected to the image forming apparatus 1, for forming the image on the recording material.

In this embodiment, the controller 30 includes an image formation pre-preparation process portion 31*a*, an ATVC process portion 31*b*, and an image forming process 31*c*. Further, the controller 30 includes a primary transfer voltage storing portion/calculating (computing) portion 31*d*, a cleaning voltage storing portion/calculating portion 31*e*, a secondary transfer voltage storing portion/calculating portion 31*f*, an image forming counter storing portion/calculating portion 31*g*, and a timer storing portion/calculating portion 31*h*. Incidentally, the respective process portions and the storing portions/calculating portions may also be provided as parts of the CPU 31 or the RAM 33. The controller 30 is capable of executing operations in a plural-color mode and a single-color mode in a switching manner. In the operation in the plural-color mode, an image is formed with a plurality of colors by applying the primary transfer voltage to the plurality of primary transfer portions 48*y*, 48*m*, 48*c* and 48*k*. In the operation in the single-color mode, an image is formed with a single color by applying the primary transfer voltage to only one primary transfer portion (for example, 48*k*) of the plurality of primary transfer portions 48*y*, 48*m*, 48*c* and 48*k*.

Next, an image forming operation in the thus-constituted image forming apparatus 1 will be described.

When the image forming portion is started, first, the photosensitive drum 51 is rotated and the surface thereof is electrically charged by the charging roller 52*y*. Then, by the exposure device 42*y*, laser light is emitted to the photosensitive drum 51*y* on the basis of image information, so that an electrostatic latent image is formed on the surface of the photosensitive drum 51*y*.

By the developing device 20*y*, this electrostatic latent image is developed with the toner and thus is visualized as a toner image.

Then, the toner image on the photosensitive drum 51*y* is primary-transferred onto the intermediary transfer belt 44*b*. Such an operation is also performed at the image forming portions for other colors, so that toner images of a plurality of colors are primary-transferred superposedly onto the intermediary transfer belt 44*b*.

On the other hand, the recording material S is supplied in parallel to such a toner image forming operation, so that the recording material S is conveyed to the secondary transfer device 45 by being timed to the toner images on the intermediary transfer belt 44*b*.

Then, in the secondary transfer portion N, the toner images are transferred from the intermediary transfer belt 44*b* onto the recording material S. The recording material S on which the toner images are transferred is conveyed to the fixing portion 46, where unfixed toner images are heated and pressed and thus are fixed on the surface of the recording material S, and then is discharged from the apparatus main assembly 10.

[ATVC]

Here, in this embodiment, during the image formation, the secondary transfer voltage applied to the secondary transfer portion N is set by ATVC (Active Transfer Voltage Control) as an operation in a first mode. The ATVC as the operation in the first mode is an operation in a mode in which a plurality of different first transfer voltages (first test voltages) are applied to the secondary transfer portion N and currents are detected at the respective transfer voltages by the current detecting sensor 76*b*, and thus a relationship between the transfer voltage and the current is acquired. That is, in the ATVC (operation), in a state in which the recording material S does not pass through the secondary transfer portion N, constant voltages at a plurality of levels are applied to the outer secondary transfer roller 45*b*, and then values of currents flowing through the outer secondary transfer roller 45*b* at that time are measured. Then, a voltage-current characteristic is acquired, and on the basis of this, a voltage corresponding to a target current value necessary for transfer of the toner image during the image formation is calculated by interpolation. Further, a voltage value obtained by adding a shared voltage of the recording material to the resultant voltage is set at a transfer voltage value used during the image formation. The target transfer current value and the shared voltage of the recording material are set in accordance with table data set in advance depending on a temperature and a humidity in an environment in which the image forming apparatus is placed.

Figure 3:
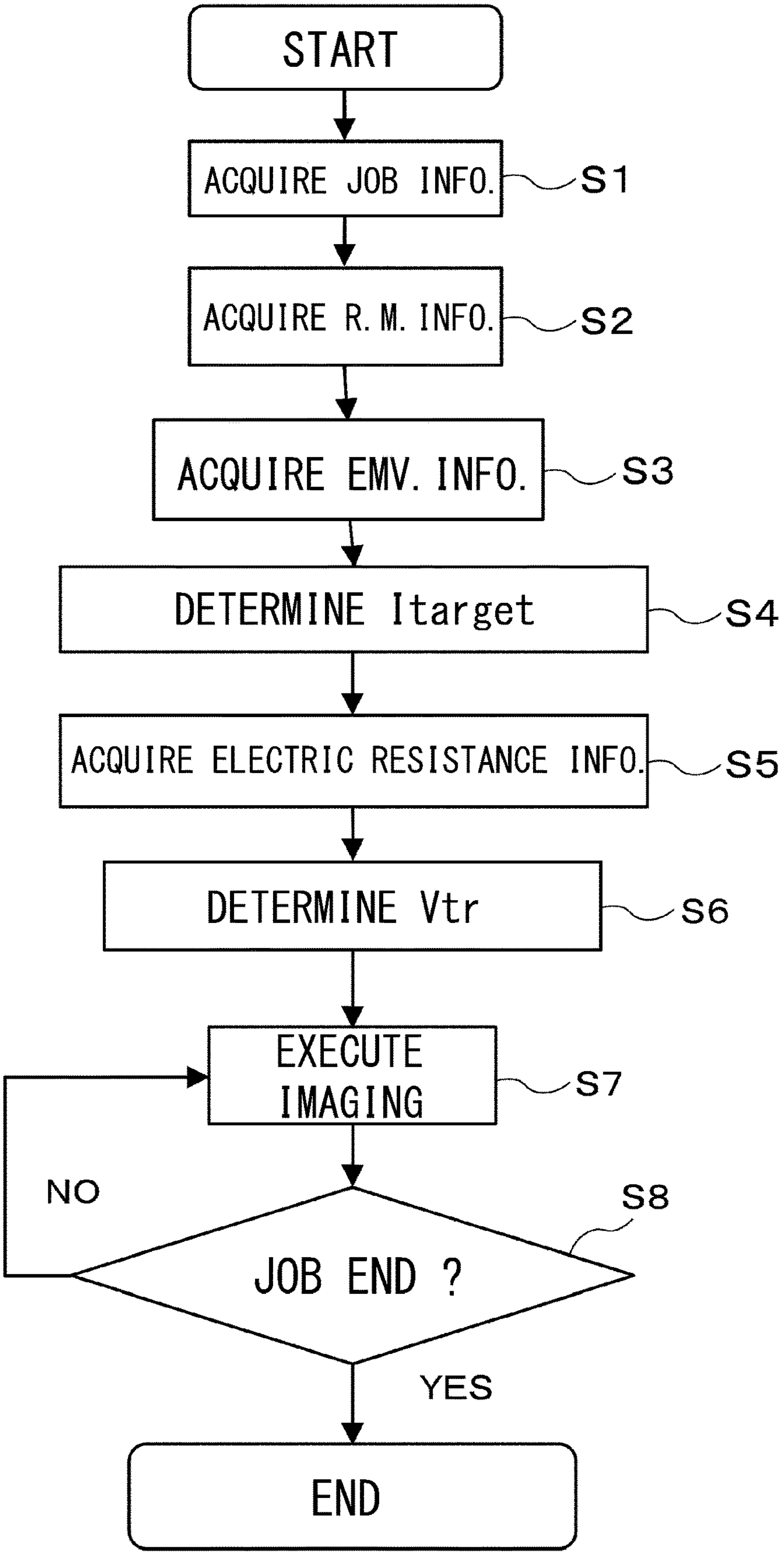
FIG. 3 is a flowchart of ATVC according to the first embodiment.

A flow of such ATVC will be specifically described using FIG. 3. When the controller 30 acquires job information from the operating portion 70 or an unshown external device, a job operation is started (S1). The controller 30 writes the job information, such as image information or recording material information, in the RAM 33 (S2). Then, the controller 30 acquires environmental information detected by the temperature sensor 71 and the humidity sensor 72 (S3). Further, in the ROM 32 as a storing portion, information indicating a correlation between the environmental information and a target transfer current Itarget for transferring the toner images from the intermediary transfer belt 44*b* onto the recording material S is stored.

The controller 30 acquires the target transfer current Itarget corresponding to the environment from data indicating the relationship between the above-described environmental information and the target transfer current Itarget on the basis of the environmental information read in S3, and writes this (target transfer current Itarget) in the RAM 33 (S4). Incidentally, the reason why the target transfer current Itarget is changed is that a toner charge amount changes depending on the environment.

Then, the controller 30 acquires information on an electric resistance of the secondary transfer portion N by the ATVC before the toner images on the intermediary transfer belt 44*b* and the recording material S onto which the toner images are to be transferred reach the secondary transfer portion N (S5). That is, in a state in which the outer secondary transfer roller 45*b* and the intermediary transfer belt 44*b* are contacted to each other, predetermined voltages of a plurality of levels are supplied from the secondary transfer voltage source 76 to the outer secondary transfer roller 45*b*. Then, current values when the predetermined voltages are supplied are detected by the current detecting sensor 76*b*, so that a relationship between the voltage and the current (i.e., voltage-current characteristic) is acquired. This voltage-current characteristic changes depending on the electric resistance of the secondary transfer portion N.

Next, the controller 30 acquires a value of a voltage to be applied from the secondary transfer voltage source 76 to the outer secondary transfer roller 45*b* (S6). That is, on the basis of the target transfer current Itarget written in the RAM 33 in S4 and the relationship between the voltage and the current acquired in S5, the controller 30 acquires a voltage value Vb necessary to cause the target transfer current Itarget to flow through the secondary transfer portion N in a state in which the recording material S is absent in the secondary transfer portion N.

Further, in the ROM 32, information for acquiring a recording material shared voltage Vp is stored. This information is held as table data showing a relationship between an ambient water content and the recording material shared voltage Vp for each of sections of a basis weight of the recording material S set in advance. Incidentally, the controller 30 is capable of acquiring the ambient water content on the basis of the environmental information (information on the temperature and the humidity) detected by the temperature sensor 71 and the humidity sensor 72. The controller 30 acquires the recording material shared voltage Vp from the above-described table data on the basis of the job information acquired in S1 and the environmental information acquired in S3.

Further, in the case where an adjusting value is set by an operation in an adjusting mode of the secondary transfer voltage described later, an adjusting amount $\Delta V$ thereof is acquired. Then, the controller 30 acquires, as a secondary transfer voltage Vtr, a voltage applied from the secondary transfer voltage source 76 to the outer secondary transfer roller 45*b* when the recording material S passes through the secondary transfer portion N, which is $Vb+Vp+\Delta V$ obtained by the sum of Vb, Vp and $\Delta V$, and is written in the RAM 33. Incidentally, the table data for acquiring the recording material shared voltage Vp is acquired in advance by an experiment or the like.

Next, the recording material S is sent to the secondary transfer portion N, where the image formation is carried out while applying the secondary transfer voltage Vtr (S7). Thereafter, the controller 30 repeats S7 until all the images in the job are completely transferred and outputted onto the recording material S (S8).

Incidentally, in this embodiment, an example in which the ATVC is carried out by applying a plurality of different first transfer voltages (first test voltages), i.e., by applying a plurality of test biases at a plurality of levels, is described, but the present invention is not limited thereto. For example, the ATVC may also be carried out by detecting a voltage applied when the voltage is subjected to constant-current control so as to provide the target transfer current Itarget. That is, the ATVC may also be carried out with a test bias of a single level.

[Adjusting Mode of Secondary Transfer Voltage]

Next, the operation in the adjusting mode of the secondary transfer voltage which is a mode and a second mode will be described. For example, depending on a kind of the recording material used by the user, the resistance value of the recording material is different from the recording material resistance value held as the above-described table data, and therefore, in the case where the recording material shared voltage Vp in the table data is used, optimum transfer cannot be carried out in some instances.

Specifically, in order to prevent an occurrence of defective image when the toner images on the intermediary transfer belt 44*b* are transferred onto the recording material, it is required that the optimum secondary transfer voltage Vtr is applied. However, in the case where the resistance value of the recording material used by the user is higher than the recording material resistance value held as the table data, there is a liability that a current necessary for transferring the toner image becomes insufficient and thus a defective transfer image (transfer void image) occurs. For that reason, in this case, the secondary transfer voltage Vtr has to be set at a high value in some instances.

Further, in the case where the water content of the recording material decreases and an electric discharge phenomenon is liable to occur, there is a is possibility that an image defect such as a void image due to abnormal discharge occurs, so that there is a case that the secondary transfer voltage Vtr has to be lowered.

Therefore, an operation in a mode which is performed for obtaining an adjusting amount necessary to provide the optimum secondary transfer voltage Vtr at which the defective image does not occur is an operation in an adjusting mode. In the operation in the adjusting mode, predetermined images are transferred from the intermediary transfer belt 44*b* onto the recording material at a plurality of different transfer voltages (test voltages, second test voltages), and then the recording material is outputted. That is, the operation in the adjusting mode is an operation in a mode in which a test chart for adjusting the transfer voltage, set during the image formation, by transferring the predetermined images from the intermediary transfer belt 44*b* onto the recording material at the plurality of different test voltages is outputted.

Figure 4:
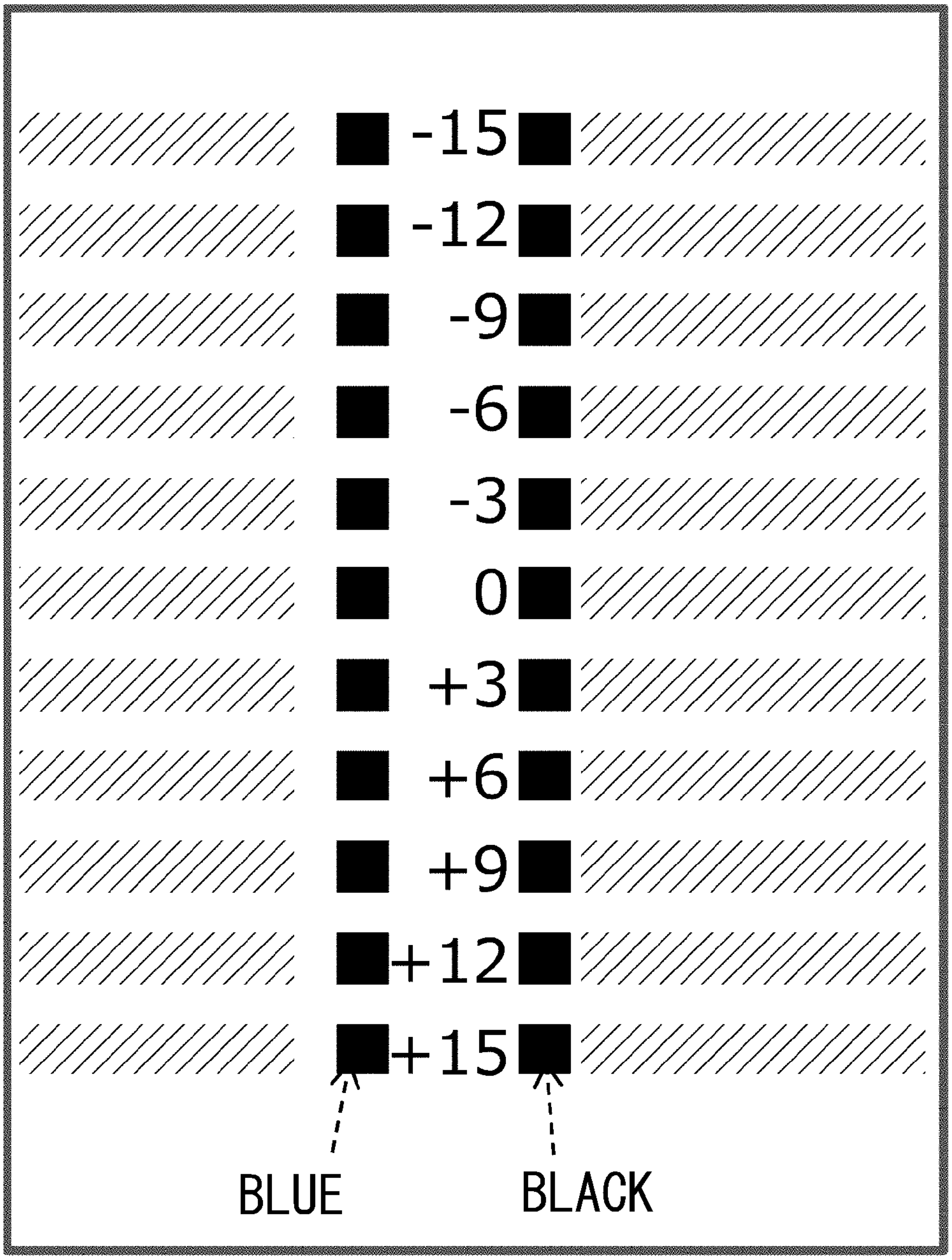
FIG. 4 is a schematic view showing an example of an adjusting image chart in an operation in a secondary transfer voltage adjusting mode according to the first embodiment.

Specifically, a recording material on which an adjusting image chart as shown in FIG. 4 is formed is outputted. As regards the adjusting image chart shown in FIG. 4, pattern images each including a solid density image (solid black portion) and a halftone density portion (hatched portion) are formed. Further, the respective pattern images are formed while changing a transfer property by switching an output value of the secondary transfer voltage Vtr for each of the pattern images.

Then, on the basis of the plurality of predetermined images on the outputted recording material, the transfer voltage during the image formation is adjusted by using the transfer voltage selected from the plurality of different transfer voltages. For example, the user selects the transfer voltage corresponding to the image discriminated as an optimum image from the plurality of predetermined images on the outputted recording material, and then the user adjusts the secondary transfer voltage Vtr used during subsequent image formation by using the selected transfer voltage. That is, the user selects the pattern image, providing an optimum transfer property, from the adjusting image chart, and the controller 30 acquires an adjusting amount ΔV of the secondary transfer voltage Vtr.

By this operation in the adjusting mode, there is no need to perform an operation such that, for example, the user outputs intended images on the sheets one by one while changing the secondary transfer voltage and then determines the adjusting amount ΔV while checking the transfer property, so that it becomes possible to reduce the number of the recording materials used for the checking and to reduce an adjusting time.

Figure 5:
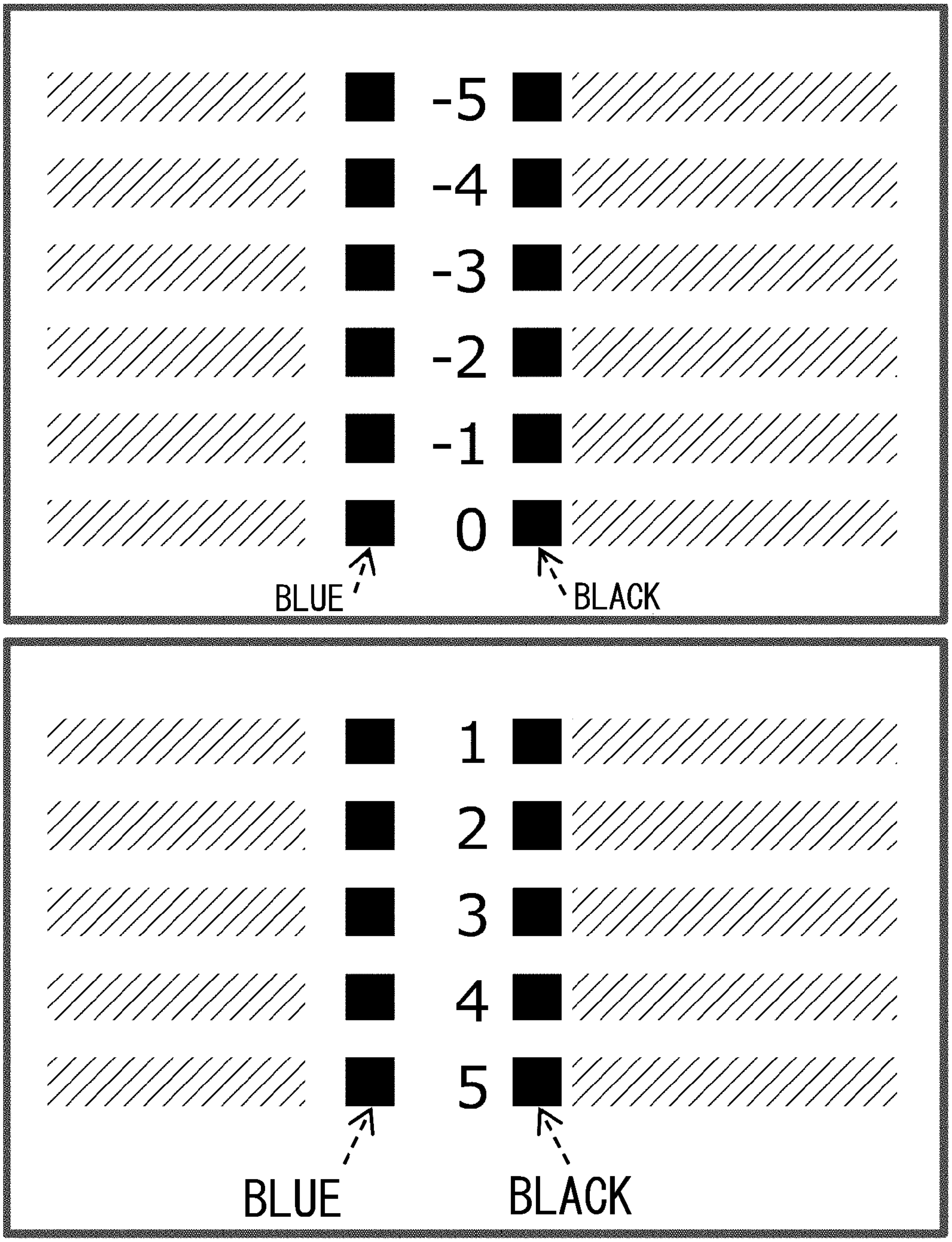
FIG. 5 is a schematic view showing another example of the adjusting image chart in the operation in the secondary transfer voltage adjusting mode according to the first embodiment.

The adjusting image chart will be specifically described using FIGS. 4 and 5. In the operation in the adjusting mode of the secondary transfer voltage in this embodiment, an image chart including pattern images in each of which a solid density image of a secondary color of blue, a solid density image of black (single color), and a halftone density image of black, which are as shown in FIG. 4 and which are suitable for discriminating the transfer property are arranged, is used. Incidentally, when a size thereof is small, it is difficult to make discrimination, and therefore, an image size may preferably be 10 mm square or more, more preferably be 25 mm square or more.

On a side of each of the pattern images, a value corresponding to an adjusting amount ΔV of the secondary transfer voltages Vtr applied to the pattern image is indicated. That is, on the recording material outputted in the operation in the adjusting mode, values relating to a plurality of different transfer voltages are also printed correspondingly to a plurality of predetermined images. To the pattern image with this value of 0, of Vb+Vp+ΔV of the secondary transfer voltage Vtr, a value of a voltage of which adjusting amount ΔV is 0 V set in the above-described ATVC is applied. Further, this adjusting amount is calculated in this embodiment in a manner such that 100 V is regarded as "1", and for example, in the case where the adjusting amount ΔV is +300 V, the adjusting amount is indicated as "+3", and to the pattern image, the secondary transfer voltage Vtr which is Vb+Vp+300 V is applied.

A maximum recording material size usable in the image forming apparatus is 13 inch×19.2 inch, but even in the case where the adjusting image chart is formed on a recording material smaller than the recording material with a maximum size, the adjusting image chart is outputted in conformity to the recording material on a leading end center basis. For example, as regards an A3 size, the adjusting image chart is outputted by cutting a region in a size of 292×415 mm. In this embodiment, as an example, the adjusting image chart in which 11 pattern images are arranged was used, but the present invention is not limited thereto.

A size of each pattern image is such that each of the solid density images of the secondary color of blue and the (single color of) black is 25.7 mm square and that the halftone density image of gray extends from a portion adjacent to the associated solid density image (of blue or black) to an associated end portion with respect to a widthwise direction perpendicular to a feeding direction with a length of 25.7 mm with respect to the feeding direction. An interval of adjacent pattern images, with respect to the feeding direction is 9.5 mm, and the secondary transfer voltage Vtr is switched in this interval. The 11 pattern images arranged in the feeding direction range 387 mm so as to fall within the A3 size of 415 mm with respect to the feeding direction.

At leading and trailing end portions, there is a possibility that another defective image which is liable to occur only at the leading and trailing end portions occurs, and therefore, formation of the pattern images is not carried out.

In the case where the recording material shorter in length with respect to the feeding direction than the A3-size recording material is used, an adjusting image chart as shown in FIG. 5 is used. An entire size of this adjusting image chart is 13 inch×210 mm, so that this adjusting image chart is capable of meeting from the recording materials fed in an A5 short edge feeding manner to the recording materials of less than A3 size in length. In conformity to a length of the recording material with respect to the widthwise direction, a width of the halftone density image becomes short, and an output length of 5 pattern images with respect to the feeding direction is 167 mm, so that a trailing end margin becomes long correspondingly to the length of the recording material. On one sheet, only the 5 pattern images can be printed, so that in order to increase the number of pattern images, the pattern images are outputted on two sheets.

[Transfer Voltage Setting in Operation in Adjusting Mode]

Figure 6:
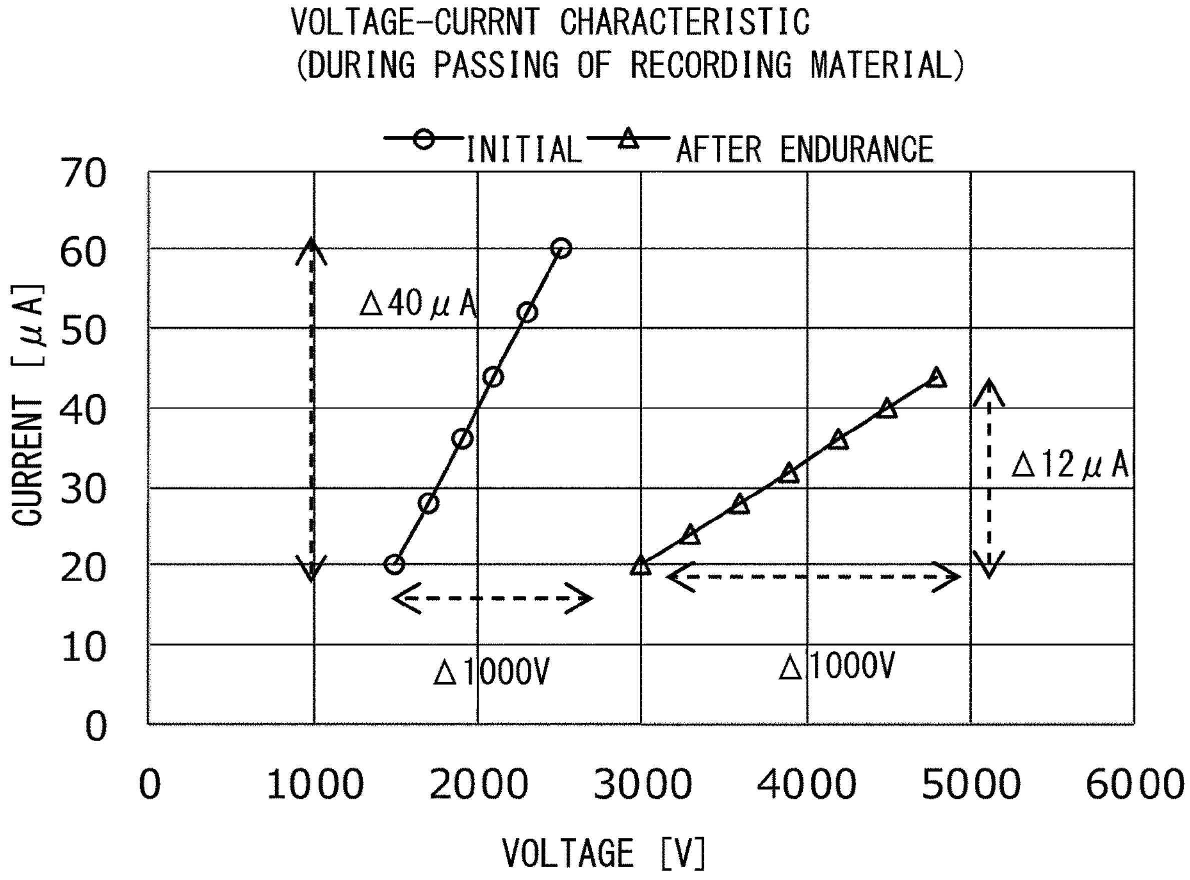
FIG. 6 is a graph showing a relationship between a transfer voltage and a current in an initial stage of an outer secondary transfer roller and a state in which use of the outer secondary transfer roller is advanced.

Next, transfer voltage setting in the operation in the adjusting mode of the secondary transfer voltage in this embodiment will be described. As a transfer member for transferring the toner image from the intermediary transfer belt 44*b* onto the recording material or from the photosensitive drum onto the recording material, an electroconductive member, such as a transfer roller, prepared by molding with a foam rubber using an ion-conductive material, is frequently used. The transfer member using the ion-conductive material has a characteristic such that a resistance value increases when a certain voltage is continuously applied. FIG. 6 is a graph showing a relationship between a voltage and a current during passing of the recording material through the secondary transfer portion N in the case where the outer secondary transfer roller 45*b* using the ion-conductive material is used for showing an example of an increase in resistance, in an initial stage of the outer secondary transfer roller and a state in which use of the outer secondary transfer roller is advanced (after endurance). That is, a voltage-current characteristic which is a relationship between a voltage applied by the secondary transfer voltage source 76 and a current detected by the current detecting sensor 76*b* at that time is shown in FIG. 6. As is understood from FIG. 6, the outer secondary transfer roller 45*b* is increased in resistance value with use, so that the voltage-current characteristic changes.

That is, when the resistance value of the outer secondary transfer roller 45*b* becomes high due to the use, a change amount of the current value becomes smaller than a change amount of the transfer voltage. Then, even when the plurality of pattern images are outputted as shown in the above-described FIGS. 4 and 5, the change amount of the current value for each of the pattern images is small, and a difference in transfer property is not readily distinguished, so that discrimination of the optimum transfer voltage is not readily made. For example, in the state after the endurance of the outer secondary transfer roller 45*b*, even when the plurality of pattern images are outputted by changing the transfer voltage in a change amount similar to the change amount in the initial stage, a difference in transfer property is not readily distinguished in comparison with the image chart outputted in the case of the initial stage. On the other hand, in order to properly discriminate the transfer property even in the state after the endurance, it would be considered that the number of the pattern images to be outputted is increased. However, in this case, the number of output sheets of the recording materials onto which the pattern images are to be transferred increases.

Therefore, in this embodiment, in the operation in the adjusting mode of the secondary transfer voltage, the secondary transfer voltage Vtr applied while being changed for each of the pattern images of the adjusting image chart is set on the basis of the voltage-current characteristic of the transfer member acquired in the ATVC, not a fixed value. That is, the plurality of different transfer voltages in the operation in the adjusting mode are set on the basis of the relationship between the transfer voltage and the current acquired in the ATVC. By this, even in the case where the resistance value of the transfer member fluctuates, and even in the state after the endurance, the difference in transfer property can be made easily distinguishable, so that it becomes possible to make proper adjustment of the secondary transfer voltage.

Figure 7:
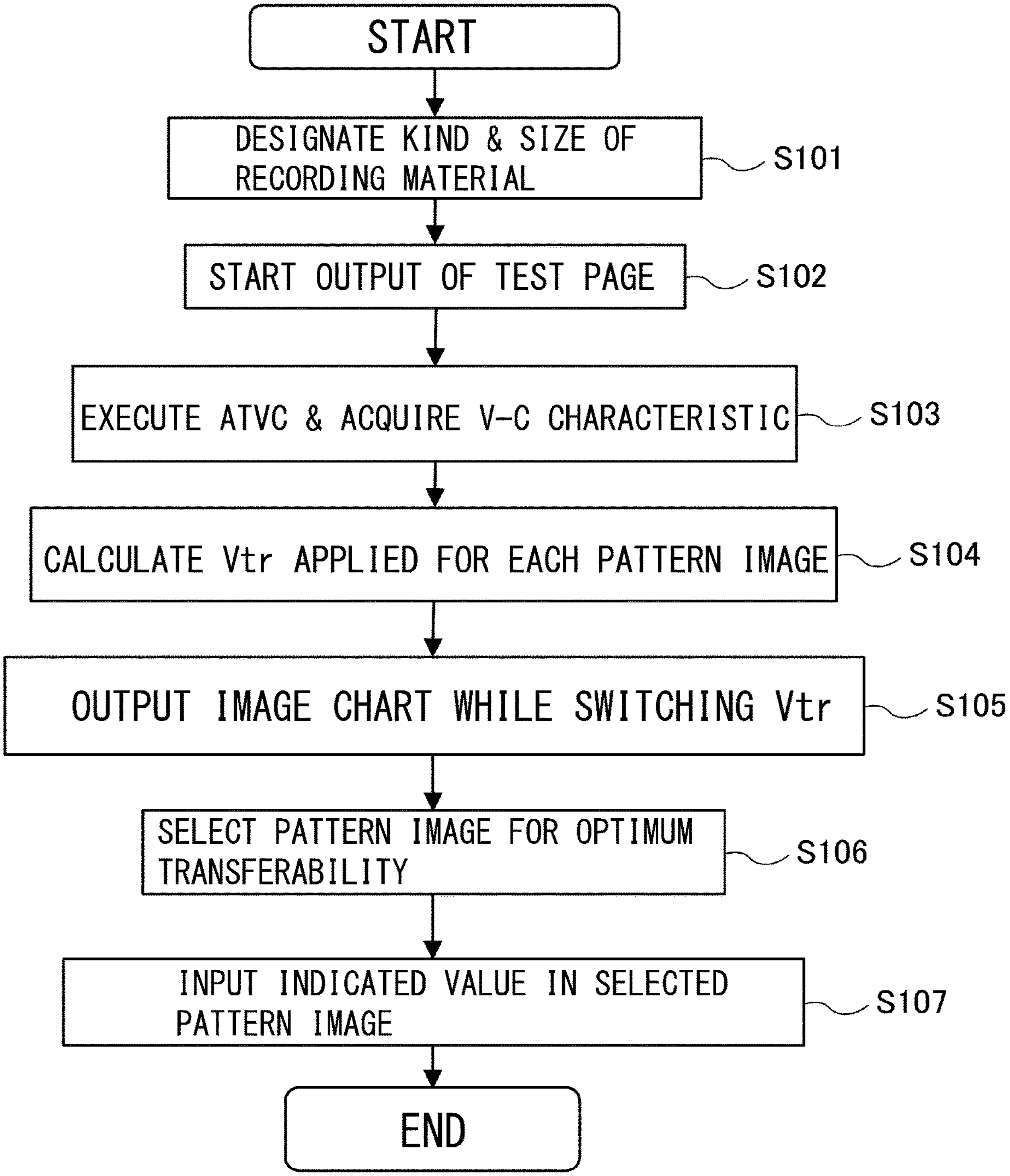
FIG. 7 is a flowchart of the operation in the secondary transfer voltage adjusting mode according to the first embodiment.

In the following, the operation in the adjusting mode of the secondary transfer voltage in this embodiment will be described using a flowchart of FIG. 7. Incidentally, in FIG. 8, an explanatory view using a graph for a calculating method of the secondary transfer voltage Vtr applied to the pattern image in the adjusting image chart in S104 of a flow of the operation in the adjusting mode of the secondary transfer voltage in FIG. 7 is shown.

The user selects a kind and a size of the recording material for which the secondary transfer voltage is intended to be adjusted and whether printing is one-side printing or double-side printing through the operating portion 70 (S101). Here, the case where an A3-size recording material with a basis weight of 150 $g/m^2$ is outputted by the one-side printing will be described. Subsequently, when the user selects a test page output button through the operating portion 70 (S102), the image forming apparatus starts an image forming operation of a test page and executes the ATVC during pre-rotation of this image forming operation, so that the voltage-current characteristic of the secondary transfer portion is acquired (S103). Incidentally, the pre-rotation refers to a period in which rotation of the photosensitive drum is started as a preparation operation before the image forming operation and in which successive rising and adjustment of various voltages are carried out. Further, the test page refers to a page on which the adjusting image chart including the above-described plurality of pattern images is formed.

Next, the secondary transfer voltage Vtr to be applied to the pattern image in the adjusting image chart is calculated (S104). A calculating method will be specifically described using the explanatory view of FIG. 8 as an example. Incidentally, the following (1) to (4) correspond to (1) to (4), respectively, of FIG. 8.

(1) First, by using an approximate expression of the voltage-current characteristic of the secondary transfer portion acquired by the ATVC, a voltage value Vb necessary to cause the target transfer current Itarget (for example, 37 μA) to flow through the secondary transfer portion depending on a condition selected in S101 is acquired. Further, the recording material shared voltage Vp (for example, 1500 V) is acquired by making reference to the table data.

(2) The adjusting amount (value) ΔV is set at 0 V, and then the secondary transfer voltage Vtr (for example, 4200 V) which is Vp+Vb+ΔV is acquired, and the secondary transfer voltage Vtr at this time is used as a center value Vtr (def). Further, on a side of the pattern image with the center value Vtr (def), 0 is indicated as a value corresponding to the adjusting amount ΔV.

(3) A current amount ΔIn (for example, 4 μA) changed for each pattern image and a voltage value ΔVn (for example, Δ300 V) corresponding to the changed ΔIn are calculated from the approximate expression, which is set in advance, of the voltage-current characteristic acquired by the ATVC.

(4) The secondary transfer voltage Vtr to be applied to an associated pattern image is set by adding the voltage value ΔVn for the associated pattern image to the center value Vtr (def) of the secondary transfer voltage Vtr in the above-described (2).

In the above-described (4), for example, the secondary transfer voltage Vtr for the pattern image in which the transfer voltage is increased from the center value Vtr (def) by one level is set in the following manner. That is, 300 V which is the voltage value ΔVn corresponding to the current value ΔIn which corresponds to one level is used as the adjusting amount value ΔV, so that 4500 V is obtained by adding 300 V to 4200 V which is the center value Vtr (def).

On the side of the associated pattern image, "+3" is indicated in this case by regarding 100 V as "1".

Also, as regards other pattern images, the secondary transfer voltages Vtr are set in a similar manner, and thereafter, the adjusting image chart as shown in FIG. 4 is outputted while switching an output value for each of the pattern images (S105).

The user selects the pattern image providing an optimum transfer property from the outputted adjusting image chart (S106), and the indicated value is inputted as recording material information to a predetermined portion on a display screen of the operating portion 70 and thus is recorded in the image forming apparatus (S107). Thereafter, in the case where the user uses this recording material, the adjusting amount ΔV is reflected, so that the optimum transfer property can be obtained.

Figure 9:
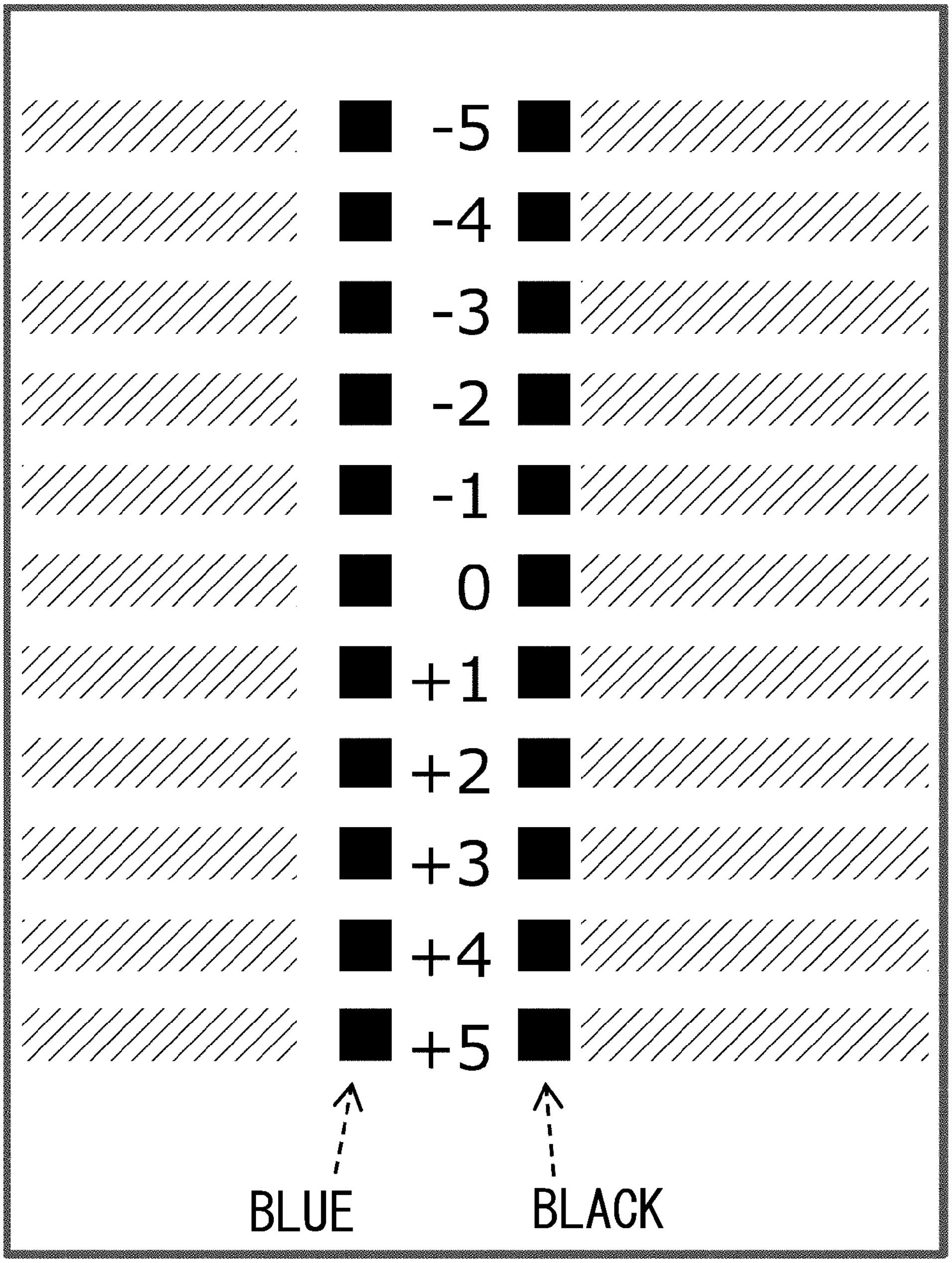
FIG. 9 is a schematic view showing an example of an adjusting image chart in the operation in the secondary transfer voltage adjusting mode in the initial stage according to the first embodiment.

In FIG. 9, an adjusting image chart outputted in the operation in the adjusting mode of the secondary transfer voltage in this embodiment in the case where the outer secondary transfer roller 45*b* in the initial stage is used is shown. In the initial stage, compared with after the endurance shown in FIG. 4, the resistance value of the outer secondary transfer roller 45*b* is low, and the voltage value ΔVn to be changed becomes small, and therefore, a small value is indicated on a side of the associated pattern image.

That is, in this embodiment, a difference (voltage value ΔVn) between a plurality of different secondary transfer voltages (between test voltages) in the operation in the adjusting mode of the secondary transfer voltage is a first difference in the case where the cumulative number of sheets of the recording materials passed through the secondary transfer portion N is a first number of sheets (for example, in the initial stage). On the other hand, the voltage value ΔVn is a second difference larger than the first difference in the case where the cumulative number of sheets of the recording materials passed through the secondary transfer portion N is a second number of sheets (for example, after endurance) more than the first number of sheets. In other words, the voltage value ΔVn is made small in the case where the cumulative number of sheets is small, i.e., in the initial stage or in a state close to the initial stage, and is made large in the case where the cumulative number of sheets is large, i.e., after the endurance.

Further, in this embodiment, the difference (voltage value ΔVn) between the plurality of different secondary transfer voltages (between test voltages) in the operation in the adjusting mode of the secondary transfer voltage is the first difference in the case where a resistance value of the outer secondary transfer roller 45*b* is a first resistance value. On the other hand, the voltage value ΔVn is the second difference larger than the first difference in the case where the resistance value of the outer secondary transfer roller 45*b* is a second resistance value larger than the first resistance value.

Figure 8:
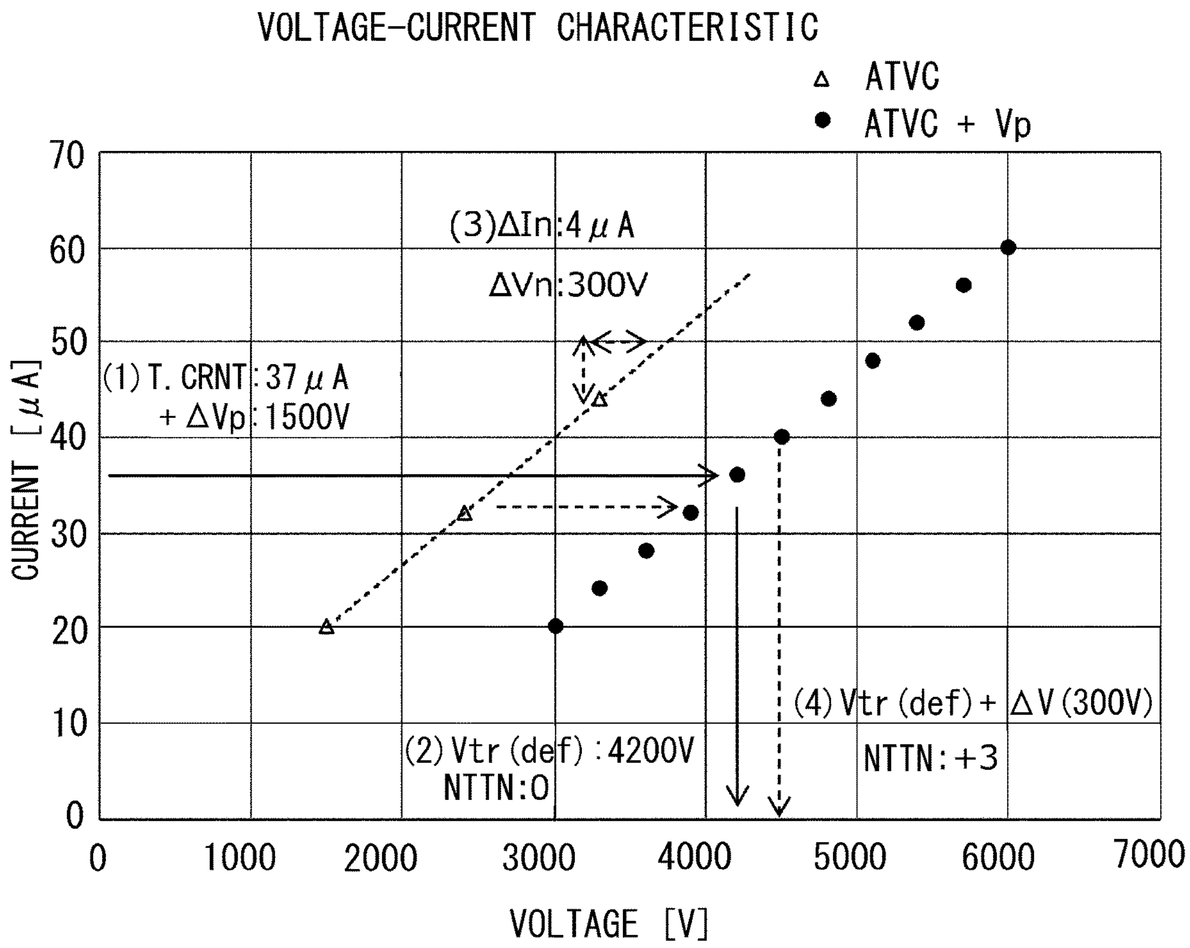
FIG. 8 is a graph for illustrating setting of the transfer voltage in the operation in the secondary transfer voltage adjusting mode according to the first embodiment.

As shown in the above-described FIG. 6 on a left-hand side, in the initial stage, the change in current is larger than the change in voltage, and therefore, as shown in FIG. 8, even when the voltage value ΔVn is small, the change amount of the current value for each of the pattern images is large, so that the difference in transfer property can be distinguished. On the other hand, in the case where, also after the endurance, the plurality of pattern images are formed with the same voltage value ΔVn as the voltage value ΔVn in the initial stage, as shown in FIG. 6 on a right-hand side, the change in current relative to the change in voltage is small, and therefore, the change amount of the current value for each of the pattern images is small, so that the transfer property is not readily distinguished.

Therefore, in this embodiment, the voltage value ΔVn is set using the voltage-current characteristic of the secondary transfer portion acquired by the ATVC. By this, in the case where the resistance value of the outer secondary transfer roller 45*b* after the endurance increases and the voltage-current characteristic is in the right-side state of FIG. 6, the voltage value ΔVn becomes large. As a result of this, the change amount of the current value for each pattern image can be made large, so that the transfer property can be made distinguishable. Further, in order to distinguish the transfer property, there is no need to increase the number of pattern images by increasing the number of output sheets of the adjusting image chart.

Thus, in this embodiment, selection accuracy of the optimum transfer voltage can be improved while suppressing an increase in the number of output sheets of the recording materials on which the pattern images as the predetermined images are transferred. That is, in this embodiment, the optimum adjusting image chart can be outputted depending on the resistance value of the outer secondary transfer roller 45*b*. For this reason, even in the case where the resistance value of the outer secondary transfer roller 45*b* fluctuates, in the operation in the mode in which the adjustment of the secondary transfer voltage is performed, it is possible to improve selection accuracy of the optimum transfer setting value by reducing an adjusting time without increasing the number of output sheets of the adjusting image chart.

In this embodiment, an example in which the voltage value ΔVn corresponding to a current value ΔIn which corresponds to one level is acquired on the basis of the voltage-current characteristic acquired by the ATVC was described, but the present invention is not limited thereto. For example, the present invention is also applicable to the case where a test voltage of one level is applied in the ATVC. In this case, the voltage value ΔVn corresponding to the current value ΔIn which corresponds to one level may also be acquired on the basis of a current when the test voltage of one level is applied. Although the accuracy lowers compared with the case where test voltages of two or more levels are applied in the ATVC, the voltage value ΔVn corresponding to the current value ΔIn which corresponds to one level can be changed depending on the resistance value of the outer secondary transfer roller.

Second Embodiment

Figure 1:
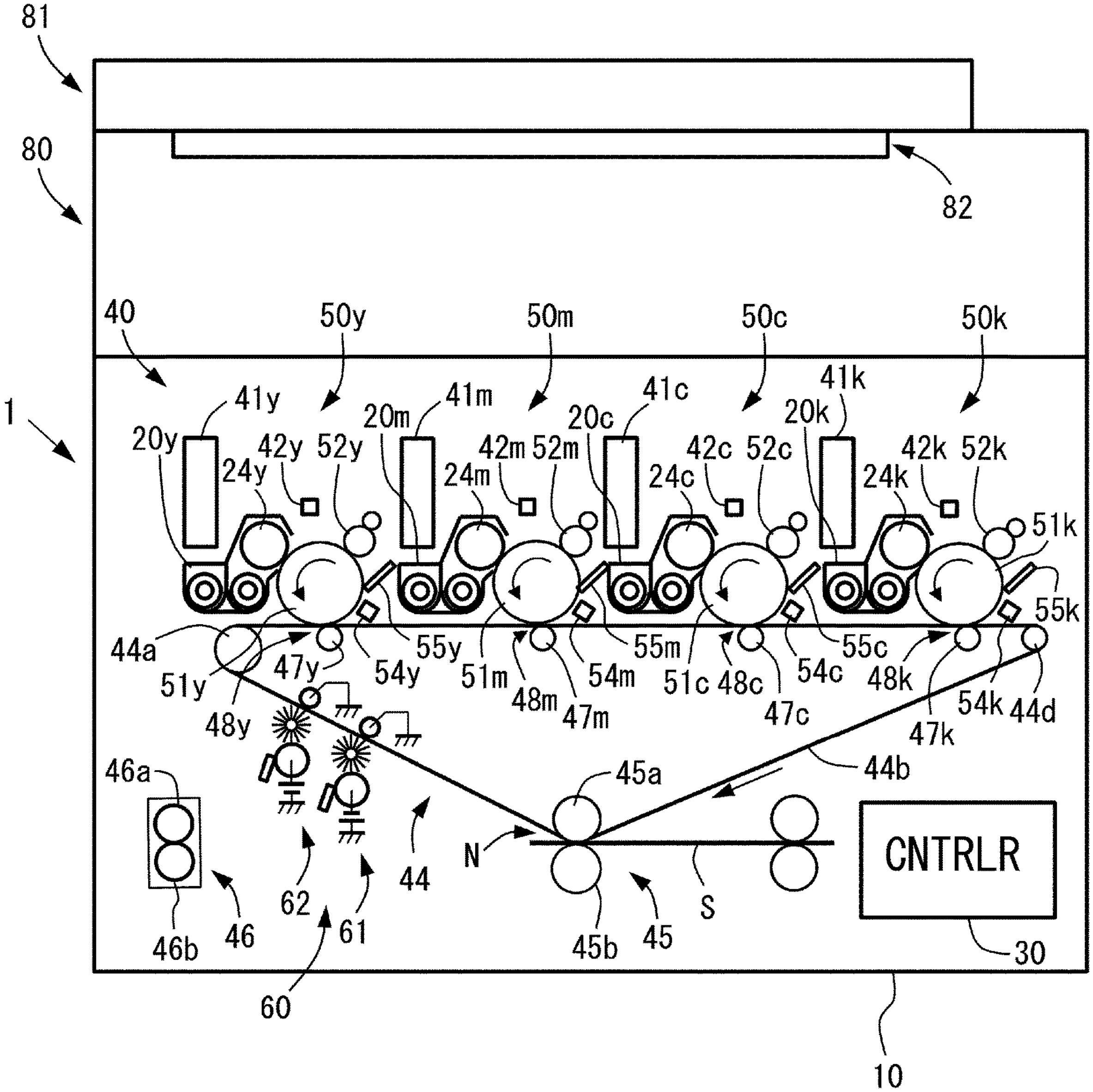
FIG. 1 is a schematic structural sectional view of an image forming apparatus according to a first embodiment.

A second embodiment will be described using FIG. 10 while making reference to FIGS. 1 and 2. In the above-described first embodiment, the secondary transfer voltage for each pattern image in the operation in the adjusting mode of the secondary transfer voltage was set using the voltage-current characteristic of the secondary transfer portion acquired by the ATVC. On the other hand, in this embodiment, in the operation in the adjusting mode of the secondary transfer voltage, without acquiring the voltage-current characteristic of the secondary transfer portion acquired by the ATVC, the secondary transfer voltage for each pattern image is set depending on a cumulative number of sheets and an environment of the image forming apparatus. Other constitutions and actions are similar to those of the above-described first embodiment, and therefore, constituent elements similar to those of the first embodiment are represented by the same reference numerals or symbols and will be omitted from description and illustration or will be briefly described. In the following, a difference from the first embodiment will be principally described.

Here, the resistance value of the outer secondary transfer roller 45*b* as the transfer member changes depending on the number of sheets used in the image forming apparatus (i.e., the cumulative number of sheets of the recording materials passed through the secondary transfer portion N) and an environment of the image forming apparatus. For this reason, in this embodiment, the secondary transfer voltage Vtr applied to the pattern image of the adjusting image chart is set on the basis of the cumulative number of sheets of the recording materials and the environment of the image forming apparatus. By this, similarly as in the first embodiment, even in the case where the resistance value of the outer secondary transfer roller 45*b* fluctuates with use, the current amount can be changed within the adjusting image chart.

The image forming apparatus of this embodiment employs a constitution in which in order to set the secondary transfer voltage for each pattern image of the adjusting image chart, acquisition of the voltage-current characteristic of the secondary transfer portion by the ATVC is not performed. For this reason, with respect to the constitution of the first embodiment, the ATVC process portion 31*b* and the current detecting sensor 76*b* (FIG. 2) for the secondary transfer voltage source may also be omitted.

On the other hand, the image forming apparatus of this embodiment causes the controller 30 (FIG. 2) also as a counting portion to count, as a value relating to the use of the outer secondary transfer roller 45*b*, the cumulative number of sheets passing through the secondary transfer portion N. Further, the value relating to the use of the outer secondary transfer roller 45*b* may also be the number of rotations of the outer secondary transfer roller 45*b*, and the controller 30 may also count this number of rotations. Further, also, in the case of this embodiment, the environment detecting portion 78 capable of detecting values relating to the temperature and the humidity is constituted by the temperature sensor 71 and the humidity sensor 72 (FIG. 2). Further, in the ROM 32 (FIG. 2) as the storing portion, a relationship between the secondary transfer voltage and the current depending on the value (the cumulative number of sheets in this embodiment) relating to the use of the outer secondary transfer roller 45*b* and depending on the temperature and the humidity is stored.

Further, in this embodiment, a plurality of different secondary transfer voltages in the operation in the adjusting mode are stored, and the secondary transfer voltage is set on the basis of the relationship between the secondary transfer voltage and the current depending on the value (cumulative number of sheets) counted by the controller 30 and the value detected by the environment detecting portion 78. In the following, this setting will be specifically described using FIG. 10.

Figure 10:
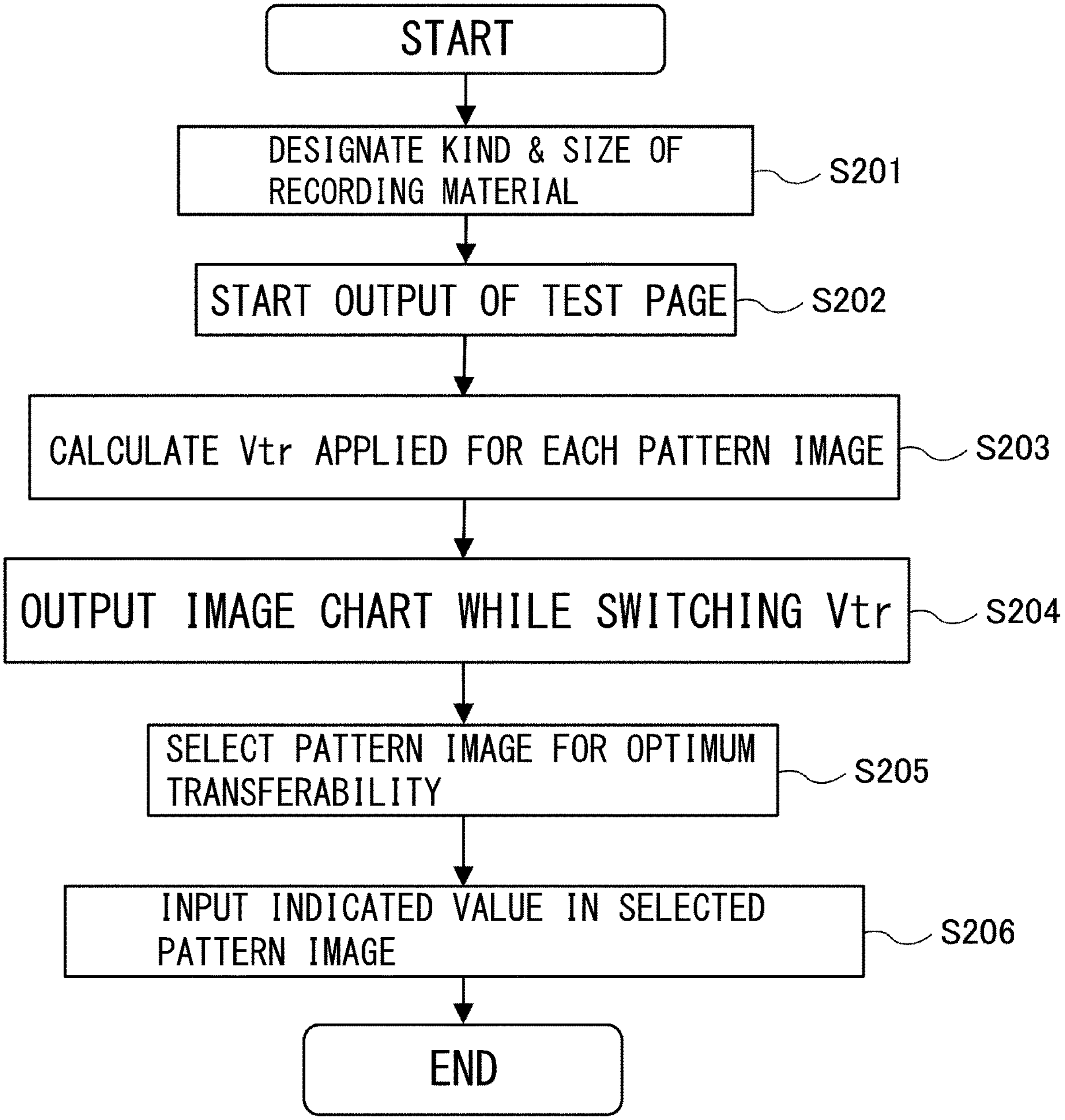
FIG. 10 is a flowchart of an operation in a secondary transfer voltage adjusting portion according to a second embodiment.

In FIG. 10, a flowchart of the operation in the adjusting mode of the secondary transfer voltage in this embodiment is shown. The user selects a kind and a size of the recording material for which the secondary transfer voltage is intended to be adjusted and whether printing is one-side printing or double-side printing through the operating portion 70 (S201). Then, the user selects a test page outputting button through the operating portion 70 (S202). Then, the secondary transfer voltage Vtr is applied to each of the pattern images in the adjusting image chart (S204).

A calculating method of the secondary transfer voltage Vtr is as follows. In this embodiment, data of ΔVn (difference between the plurality of different secondary transfer voltages in the operation in the adjusting mode of the secondary transfer voltage) corresponding to predetermined ΔIn in an actual image forming apparatus shown in FIG. 1 are acquired in advance by an experiment, and are stored as data base in the ROM 32. When the adjusting image chart is outputted, from the data base in the ROM 32, the ΔVn corresponding to the predetermined ΔIn is read, and the secondary transfer voltage Vtr applied to the pattern image is set.

Also, in the case of this embodiment, similarly as in the case described in the first embodiment, the voltage value ΔVn becomes small in a state in which the cumulative number of sheets is small, i.e., in the initial stage or in a state close to the initial stage, and becomes large in a state in which the cumulative number of sheets is large, i.e., in a state after the endurance. Further, an ambient water content (water content in the air in the image forming apparatus) is calculated from a temperature and a humidity which are detected by the environment detecting portion 78, and in the case where the calculated water content is small, the resistance value of the outer secondary transfer roller 45*b* becomes larger than the resistance value in the case where the water content is large. Accordingly, in the case where the water content is small, the voltage value ΔVn becomes larger than the voltage value ΔVn in the case where the water content is large. That is, the voltage value ΔVn is a first difference in the case where the environment in the image forming apparatus is a first environment, and is a second difference larger than the first difference in the case where the environment in the image forming apparatus is a second environment smaller in water content in the air than in the first environment.

For example, in the case where the cumulative number of sheets is the same, when the water content detected by the environment detecting portion 78 is small, the voltage value Vtr is larger than the voltage value Vtr when the water content is large. Similarly, in the case where the water content is the same, the voltage value Vtr is larger when the cumulative number of sheets is larger than when the cumulative number of sheets is small. In the ROM 32, a relationship between ΔIn and ΔVn depending on the cumulative number of sheets and the environmental information (for example, the water content) is stored. Accordingly, the controller 30 sets the secondary transfer voltage Vtr applied to the pattern image by making reference to this relationship.

The secondary transfer voltages Vtr are set and thereafter, the adjusting image chart is outputted while switching an output value for each of the pattern images (S205). The user selects the pattern image for an optimum transfer property from the outputted adjusting image chart (S206), and the indicated value is inputted as recording material information to a predetermined portion on the operating portion 70 and thus is recorded in the image forming apparatus (S207).

Thus, in this embodiment, a setting value of the secondary transfer voltage Vtr is calculated on the basis of the voltage-current characteristic depending on the value relating to the use of the outer secondary transfer roller 45*b*, i.e., the cumulative number of sheets and the environment in this embodiment, which is acquired in advance by the experiment. By this, for example, it becomes to omit a constitution relating to the ATVC. Further, even in the case of the image forming apparatus in which such a constitution is omitted and in which inexpensive and simple control is employed, an effect similar to the effect of the first embodiment can be obtained. That is, when the resistance value of the outer secondary transfer roller 45*b* fluctuates, it is possible to improve selection accuracy of the optimum transfer setting value by reducing an adjusting time without increasing the number of output sheets of the adjusting image chart for adjusting the secondary transfer voltage.

Other Embodiments

In the above-described embodiments, in the constitution of the intermediary transfer type using the intermediary transfer belt, the adjustment of the secondary transfer voltage in the secondary transfer portion was described. However, the present invention is not limited thereto, but may also be applicable to a constitution in which a direct transfer type in which the toner image is directly transferred from the photosensitive drum onto the recording material is employed and in which a primary transfer roller using, for example, the ion-conductive material is used as the transfer member. That is, the primary transfer roller forms a primary transfer portion, between itself and the photosensitive drum, for transferring the toner image from the photosensitive drum onto the recording material. Then, by applying a primary transfer voltage to the primary transfer roller, the toner image is transferred from the photosensitive drum onto the recording material. Also, in such a primary transfer portion, similarly as in the above-described secondary transfer portion, the resistance value of the primary transfer roller changes between in the initial stage and after the endurance. For this reason, the adjustment of the transfer voltage similar to the adjustment in the above-described embodiments is applicable to adjustment of the primary transfer voltage.

Further, the present invention is not limited to the image forming apparatus 1 of the tandem type using the intermediary transfer type, but may also be an image forming apparatus of another type. Further, the image forming apparatus is not limited to the full-color image forming apparatus, but may also be a monochromatic image forming apparatus or a single-color image forming apparatus. Or, the present invention can be carried out in various purposes such as printers, various printing machines, copying machines, facsimile machines, and multi-function machines.

According to the present invention, selection accuracy of an optimum transfer voltage can be improved while suppressing an increase in number of output sheets of recording materials on which predetermined images are transferred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-018316 filed on Feb. 8, 2021, which is hereby incorporated by reference herein in its entirety.

What is claimed is:

1. An image forming apparatus comprising:

an image bearing member configured to bear a toner image;

a transfer belt onto which the toner image is primary transferred from said image bearing member;

a secondary transfer member configured to secondary-transfer the toner image from said transfer belt onto a recording material in a secondary transfer portion;

a voltage source configured to apply a transfer voltage to said secondary transfer member;

a current detecting portion configured to detect a current flowing from said voltage source through said secondary transfer member; and a controller configured to control said voltage source, wherein said controller is configured to execute an operation in a first mode in which, when the recording material is absent in the secondary transfer portion, a current flowing through said secondary transfer member under application of a voltage to said secondary transfer member is detected by said current detecting portion, wherein said controller is configured to execute an operation in a second mode in which a test chart for adjusting the transfer voltage is printed, wherein the test chart includes a plurality of test images transferred from said transfer belt onto the recording material under application of a plurality of different test voltages to said secondary transfer member, wherein the plurality of test images includes a first test image and a second test image adjacent to the first test image, wherein the first test image is transferred by applying a first test voltage to said secondary transfer member and the second test image is transferred by applying a second test voltage to said secondary transfer member, and wherein on the basis of the detected current during the operation in said first mode, said controller is configured to change a difference between the first test voltage and the second test voltage.

2. An image forming apparatus according to claim 1, wherein in a case that said controller executes the operation in said second mode to a predetermined recording material, when, on the basis of the current detected by said current detecting portion in the operation in said first mode, a voltage necessary to cause a predetermined current to flow through said secondary transfer member is a first voltage, the difference is a first difference, and when, on the basis of the current detected by said current detecting portion in the operation in said first mode, the voltage necessary to cause the predetermined current to flow through said secondary transfer member is a second voltage higher than the first voltage, the difference is a second difference greater than the first difference.

3. An image forming apparatus according to claim 1, wherein said controller executes the operation in said first mode after receiving an instruction of execution of the operation in said second mode and before the execution of the operation in said second mode.

4. An image forming apparatus according to claim 1, wherein during the operation in said first mode, said controller causes said current detecting portion to detect the current flowing through said secondary transfer member under application of a plurality of different test voltages to said secondary transfer member and acquires information on a current voltage characteristic of said secondary transfer member, and wherein on the basis of the information, said controller is configured to change the difference between the first test voltage and the second test voltage.

5. An image forming apparatus according to claim 1, wherein said controller executes the operation in said second mode so as to change the first test voltage and the second test voltage on the basis of the detected current during the operation in said first mode.

6. An image forming apparatus comprising:
an image bearing member configured to bear a toner image;
a transfer belt onto which the toner image is primary transferred from said image bearing member;
a secondary transfer member configured to secondary transfer the toner image from said transfer belt onto a recording material in a secondary transfer portion;
a voltage source configured to apply a transfer voltage to said secondary transfer member;
and
a controller configured to control said voltage source,
wherein said controller is configured to execute an operation in an adjusting mode in which a test chart for adjusting the transfer voltage is printed, wherein the test chart includes a plurality of test images transferred from said transfer belt onto the recording material under application of a plurality of different test voltages to said secondary transfer member,
wherein the plurality of test images includes a first test image and a second test image adjacent to the first test image,
wherein the first test image is transferred by applying a first test voltage to said secondary transfer member and the second test image is transferred by applying a second test voltage to said secondary transfer member,
wherein said controller is configured to change a difference between the first test voltage and the second test voltage, and
wherein in a case that said controller executes the operation in said adjusting mode on a predetermined recording material in a predetermined environmental condition,
when a voltage necessary to cause a predetermined current to flow through said secondary transfer member is a first voltage, the difference is a first difference, and
when the voltage necessary to cause the predetermined current to flow through said secondary transfer member is a second voltage higher than the first voltage, the difference is a second difference greater than the first difference.

7. An image forming apparatus comprising:
an image bearing member configured to bear a toner image;
a transfer belt onto which the toner image is primary transferred from said image bearing member;
a secondary transfer member configured to secondary-transfer the toner image from said transfer belt onto a recording material in a secondary transfer portion;
a voltage source configured to apply a transfer voltage to said secondary transfer member;
a voltage detecting portion configured to detect a voltage from said voltage source; and
a controller configured to control said voltage source,
wherein said controller is configured to execute an operation in a first mode in which, when the recording material is absent in the secondary transfer portion, a voltage outputted by said voltage source under a current flowing through said secondary transfer member is detected by said voltage detecting portion,
wherein said controller is configured to execute an operation in a second mode in which a test chart for adjusting the transfer voltage is printed, wherein the test chart includes a plurality of test images transferred from said transfer belt onto the recording material under application of a plurality of different test voltages to said secondary transfer member,
wherein the plurality of test images includes a first test image and a second test image adjacent to the first test image,
wherein the first test image is transferred by applying a first test voltage to said secondary transfer member and the second test image is transferred by applying a second test voltage to said secondary transfer member, and
wherein on the basis of the detected voltage during the operation in said first mode, said controller is configured to change a difference between the first test voltage and the second test voltage.

* * * * *